(12) United States Patent
McLaughlin et al.

(10) Patent No.: US 9,412,137 B2
(45) Date of Patent: Aug. 9, 2016

(54) CLOUD COMPUTING FOR A MANUFACTURING EXECUTION SYSTEM

(75) Inventors: Paul F. McLaughlin, Ambler, PA (US); Andrew Duca, Phoenix, AZ (US); Matthew G. Burd, Calgary (CA)

(73) Assignee: Honeywell International Inc., Morris Plains, NJ (US)

( * ) Notice: Subject to any disclaimer, the term of this patent is extended or adjusted under 35 U.S.C. 154(b) by 557 days.

(21) Appl. No.: 12/416,790

(22) Filed: Apr. 1, 2009

(65) Prior Publication Data
US 2010/0256794 A1 Oct. 7, 2010

(51) Int. Cl.
| | |
|---|---|
| *G06Q 50/04* | (2012.01) |
| *G05B 19/418* | (2006.01) |
| *G06Q 10/06* | (2012.01) |
| *H04L 29/08* | (2006.01) |

(52) U.S. Cl.
CPC ............ *G06Q 50/04* (2013.01); *G05B 19/4183* (2013.01); *G06Q 10/06* (2013.01); *H04L 67/10* (2013.01); *H04L 67/12* (2013.01); *G05B 2219/31282* (2013.01); *Y02P 90/10* (2015.11); *Y02P 90/12* (2015.11); *Y02P 90/30* (2015.11)

(58) Field of Classification Search
USPC .............................. 700/108; 709/99, 205, 226
See application file for complete search history.

(56) References Cited

U.S. PATENT DOCUMENTS

| | | | |
|---|---|---|---|
| 5,657,390 A | 8/1997 | Elgamal et al. | |
| 5,920,856 A * | 7/1999 | Syeda-Mahmood | G06F 17/30017 |
| 6,029,165 A * | 2/2000 | Gable | G06F 17/2735 |
| 6,108,686 A * | 8/2000 | Williams, Jr. | G06F 17/30867 707/E17.109 |
| 6,202,023 B1 * | 3/2001 | Hancock | G01C 21/20 701/516 |
| 6,480,896 B1 | 11/2002 | Brown et al. | |
| 6,816,973 B1 | 11/2004 | Gleichauf et al. | |
| 7,130,891 B2 | 10/2006 | Bernardin et al. | |
| 7,151,966 B1 | 12/2006 | Baier et al. | |
| 7,206,286 B2 | 4/2007 | Abraham et al. | |
| 7,233,830 B1 * | 6/2007 | Callaghan et al. | 700/9 |
| 7,266,417 B2 * | 9/2007 | Liao | 700/108 |
| 7,286,897 B2 * | 10/2007 | Liu et al. | 700/180 |
| 7,313,447 B2 | 12/2007 | Hsiung et al. | |
| 7,461,403 B1 | 12/2008 | Libenzi | |
| 7,548,977 B2 | 6/2009 | Agapi et al. | |
| 7,584,274 B2 | 9/2009 | Bond et al. | |

(Continued)

FOREIGN PATENT DOCUMENTS

| | | |
|---|---|---|
| DE | 102004030781 A1 | 3/2006 |
| WO | WO 2005/020179 A1 | 3/2005 |
| WO | WO 2009/046095 A1 | 4/2009 |

OTHER PUBLICATIONS

Notification of Transmittal of the International Search Report and the Written Opinion of the International Searching Authority, or the Declaration dated Oct. 29, 2010 in connection with International Patent Application No. PCT/US2010/028218.

(Continued)

*Primary Examiner* — Kidest Bahta (57) ABSTRACT

A computing cloud system includes at least one data storage unit configured to store information associated with at least one manufacturing execution system. The computing cloud system also includes at least one processing unit configured to execute instructions associated with the at least one manufacturing execution system and at least one communications interface configured to receive information from the at least one manufacturing site and to interpret the information.

23 Claims, 6 Drawing Sheets

(56) References Cited

U.S. PATENT DOCUMENTS

| | | | |
|---|---|---|---|
| 7,620,986 | B1 | 11/2009 | Jagannathan et al. |
| 7,636,764 | B1 | 12/2009 | Fein et al. |
| 7,684,876 | B2 | 3/2010 | Grgic |
| 7,693,581 | B2 * | 4/2010 | Callaghan et al. ............... 700/9 |
| 7,799,273 | B2 * | 9/2010 | Popp .............................. 422/67 |
| 7,873,719 | B2 * | 1/2011 | Bishop et al. ................. 709/223 |
| 7,886,065 | B1 | 2/2011 | Satish et al. |
| 7,957,335 | B2 | 6/2011 | Durazzo et al. |
| 2003/0014498 | A1 | 1/2003 | Kreidler et al. |
| 2003/0061212 | A1 | 3/2003 | Smith et al. |
| 2003/0120778 | A1 | 6/2003 | Chaboud et al. |
| 2004/0002943 | A1 | 1/2004 | Merrill et al. |
| 2004/0128539 | A1 | 7/2004 | Shureih |
| 2004/0260769 | A1 | 12/2004 | Yamamoto |
| 2005/0021594 | A1 | 1/2005 | Bernardin et al. |
| 2005/0021705 | A1 | 1/2005 | Jurisch |
| 2005/0195840 | A1 | 9/2005 | Krapp et al. |
| 2005/0276228 | A1 | 12/2005 | Yavatkar et al. |
| 2005/0278441 | A1 | 12/2005 | Bond et al. |
| 2006/0004786 | A1 | 1/2006 | Chen et al. |
| 2006/0059163 | A1 | 3/2006 | Frattura et al. |
| 2006/0155633 | A1 | 7/2006 | Fellenstein et al. |
| 2006/0184626 | A1 | 8/2006 | Agapi et al. |
| 2006/0230149 | A1 | 10/2006 | Jackson |
| 2007/0055702 | A1 | 3/2007 | Fridella et al. |
| 2007/0074288 | A1 | 3/2007 | Chang et al. |
| 2008/0120414 | A1 | 5/2008 | Kushalnagar et al. |
| 2008/0159289 | A1 | 7/2008 | Narayanan et al. |
| 2008/0270523 | A1 | 10/2008 | Parmar et al. |
| 2008/0295173 | A1 | 11/2008 | Tsvetanov |
| 2009/0125370 | A1 | 5/2009 | Blondeau et al. |
| 2009/0210071 | A1 * | 8/2009 | Agrusa et al. ..................... 700/9 |
| 2009/0271012 | A1 | 10/2009 | Kopka et al. |
| 2009/0300151 | A1 | 12/2009 | Friedman et al. |
| 2009/0300210 | A1 | 12/2009 | Ferris |
| 2009/0300635 | A1 | 12/2009 | Ferris |
| 2010/0022231 | A1 | 1/2010 | Heins et al. |
| 2010/0023151 | A1 * | 1/2010 | Shieh et al. ................... 700/105 |
| 2010/0042720 | A1 | 2/2010 | Stienhans et al. |
| 2010/0256795 | A1 | 10/2010 | McLaughlin et al. |
| 2010/0257227 | A1 | 10/2010 | McLaughlin et al. |
| 2010/0257228 | A1 | 10/2010 | Staggs et al. |
| 2010/0257605 | A1 | 10/2010 | McLaughlin et al. |

OTHER PUBLICATIONS

Notification of Transmittal of the International Search Report and the Written Opinion of the International Searching Authority, or the Declaration dated Oct. 29, 2010 in connection with International Patent Application No. PCT/US2010/028210.

Notification of Transmittal of the International Search Report and the Written Opinion of the International Searching Authority, or the Declaration dated Oct. 29, 2010 in connection with International Patent Application No. PCT/US2010/028208.

Kevin P. Staggs, et al., "Cloud Computing for an Industrial Automation and Manufacturing System", U.S. Appl. No. 12/416,859, filed Apr. 1, 2009.

Paul F. McLaughlin, et al., "Cloud Computing as a Basis for a Process Historian", U.S. Appl. No. 12/416,830, filed Apr. 1, 2009.

Paul F. McLaughlin, et al., "Cloud Computing as a Basis for Equipment Health Monitoring Service", U.S. Appl. No. 12/416,848, filed Apr. 1, 2009.

Final Office Action issued on Feb. 10, 2012 in connection with U.S. Appl. No. 12/416,830.

Communication pursuant to Article 94(3) EPC dated Mar. 15, 2013 in connection with European Patent Application No. 10 764 816.4.

Supplementary European Search Report dated Mar. 4, 2013 in connection with European Patent Application No. EP 10 76 4816.

Zheng Wang, et al., "Prefetching in World Wide Web", IEEE Global Telecommunications Conference, Nov. 1996, p. 28-32.

Supplementary European Search Report dated Nov. 19, 2012 in connection with European Patent Application No. EP 10 76 4813.

* cited by examiner

CLOUD COMPUTING FOR A MANUFACTURING EXECUTION SYSTEM

TECHNICAL FIELD

This disclosure relates generally to computer systems and, more specifically, to the use of cloud computing in manufacturing execution systems, and systems and methods related to the use of cloud computing in manufacturing execution systems.

BACKGROUND

Cloud computing is an emerging technology in the information technology (IT) industry. Cloud computing allows for the moving of applications, services and data from desktop computers back to a main server farm. The server farm may be off premises and be implemented as a service. By relocating the execution of applications, deployment of services, and storage of data, cloud computing offers a systematic way to manage costs of open systems, centralize information, and enhance robustness and reduce energy costs.

SUMMARY

This disclosure provides a system and method for using cloud computing in manufacturing execution systems.

In a first embodiment, a computing cloud system includes at least one data storage unit configured to store information associated with at least one manufacturing execution system. The computing cloud system also includes at least one processing unit configured to execute instructions associated with the at least one manufacturing execution system and at least one communications interface configured to receive information from at least one manufacturing site and interpret the information.

In particular embodiments, the at least one data storage unit is configured to store at least one manufacturing history.

In other particular embodiments, the information from the at least one manufacturing site includes information associated with at least one machine at the at least one manufacturing site. The information associated with the at least one machine could include information obtained by sensors at the at least one manufacturing site.

In yet other particular embodiments, information is provided to the at least one manufacturing site through the at least one communications interface. The information provided to the at least one manufacturing site could include instructions associated with operation of at least one machine at the at least one manufacturing site.

In still other particular embodiments, the at least one communications interface is configured to connect a thin client to the computing cloud system through the at least one communications interface.

In a second embodiment, a method includes operating a manufacturing execution system. The manufacturing execution system includes a data storage unit configured to store information related to at least one client and a processor unit configured to use the information stored in the data storage unit. The method also includes connecting to the least one client and tracking an operation of the at least one client.

In a third embodiment, an apparatus includes a data storage unit configured to store instructions associated with a manufacturing execution system. The apparatus also includes a processor configured to execute the instructions and a communications interface configured to provide at least one communications link used to exchange information associated with the manufacturing execution system.

Other technical features may be readily apparent to one skilled in the art from the following figures, descriptions, and claims.

BRIEF DESCRIPTION OF THE DRAWINGS

For a more complete understanding of this disclosure, reference is now made to the following description, taken in conjunction with the accompanying drawings, in which.

DETAILED DESCRIPTION

FIGS. 1 through 6, discussed below, and the various embodiments used to describe the principles of the present invention in this patent document are by way of illustration only and should not be construed in any way to limit the scope of the invention. Those skilled in the art will understand that the principles of the invention may be implemented in any type of suitably arranged device or system.

Figure 1:
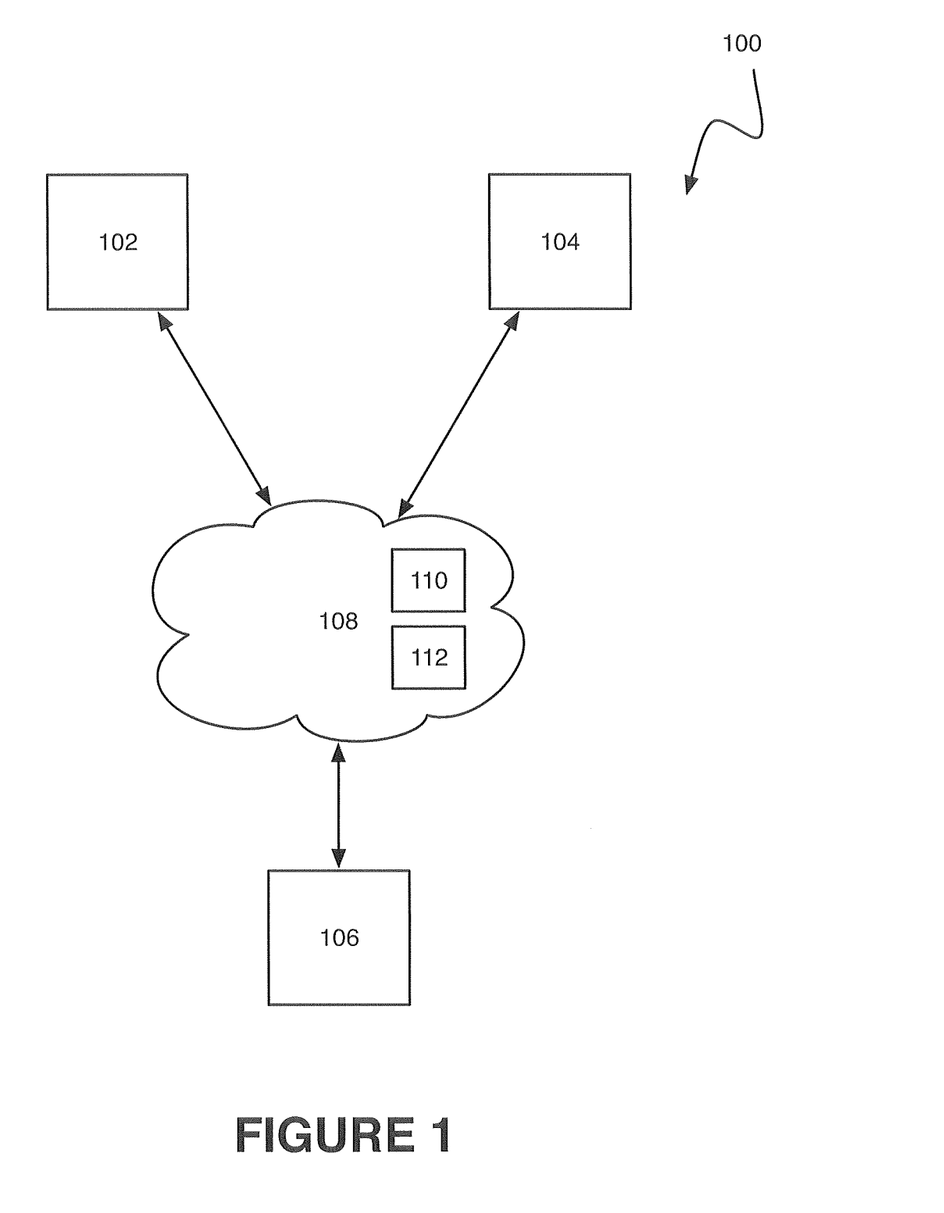
FIG. 1 illustrates an example cloud computing environment according to this disclosure.

FIG. 1 illustrates an example system 100 according to this disclosure. FIG. 1 shows clients 102, 104, and 106 connected to a computing cloud 108. Computing cloud 108 comprises processing unit 110 and data storage unit 112, both of which are accessible to clients 102, 104, and 106. One of the innovative aspects of this disclosure is the ability to design a flexible, robust cloud 108 that can service a variety of deployment environments through an innovative hybrid approach. This hybrid approach recognizes both the type of information needed as well as the location of where that information needs to be. For instance in a manufacturing execution system (MES) used in an automated factory setting, the system must recognize both the types of information needed to be processed as well as which information needs to be stored locally and which information may be stored in a computing cloud.

Computing cloud 108 is a computing cloud that is capable of both storing information and performing data functions on information. A computing cloud comprises at least one computer that is accessible from a remote location. The computing cloud 108 may comprise a plurality of storage devices that will be referred to as collectively the storage unit 112, as well as a plurality of processing units that will be referred to collectively as the processing unit 110. The computing cloud 108 may comprise hardware that is cost prohibitive to deploy and maintain at individual clients 102, 104, and 106. In addition, the computing cloud 108 may comprise software that is cost prohibitive to install, deploy, and maintain at individual computing clouds. Therefore, the computing cloud 108 may provide this hardware and software through secure connections to clients 102, 104, and 106. While there is one computing cloud 108 shown in FIG. 1, it is explicitly understood that a plurality of clouds may be consistent with this disclosure.

Clients 102, 104, and 106 are individual computers, plant sites, or operational locations that are in communication with the computing cloud 108. Clients 102, 104, and 106 are capable of accessing both the processing unit 110 and storage unit 112 that are located in the computing cloud 108. Clients 102, 104, and 106 are able to access both local processes as well as information from the computing cloud 108. Clients 102-106 may include a plurality of manufacturing tools and sensors to monitor manufacturing tools in an industrial environment. Clients 102-106 may also include a plurality of thin clients, individual computers, or other communication devices. The sensors may detect any operational condition of one or more manufacturing tools, such as temperature, vibration, or other measurable operating parameter(s).

Clients 102, 104, and 106 communicate with the computing cloud 108 through any secured or unsecured method, including Hypertext Transfer Protocol Secure (HTTPS), secure telnet, or file transfer protocol secure (FTPS). It is understood that secure methods may be preferred over unsecure methods, and that the particular method chosen will depend upon the requirements of the function being accessed. This disclosure should not be interpreted as being limited to any particular protocol or method of transferring data.

In some embodiments, the computing cloud 108 may leverage a Service Oriented Architecture (SOA) to abstract consumers of cloud services from the location services themselves. When a cloud user at a given client invokes a function, such as an MES function, that function could be performed by MES components local to the same client or redirected to MES components running on a server in the computing cloud 108. This redirection is performed by a service bus that exposes a set of service endpoints to users who interact with these services as if the services were local. The service bus directs requests for those services to the appropriate service providers either locally or in the cloud based on configured mapping. Mapping can be done on a per service basis, allowing a mix of local and cloud-based services to be used. The service bus itself could be local to the plant or also located in the cloud. The disclosed systems and methods can be designed for multi-tenancy, such that many companies can share the same physical database resources but keep their data respective entirely private.

One of the innovative features of this disclosure is the use of a hybrid approach when distributing data storage and data processing among a plurality of clouds in use by a manufacturing execution system. It is understood that a mix of cloud and on-site applications may be used concurrently, and, in some configurations, the user has a choice to host the MES application in the cloud or locally. This configuration allows for capability and functionality to be provided to the user at a consistent level regardless of the location of the MES application. Some features of the clients 102, 104, and 106 can be better performed by the computing cloud 108 than at the client 102, 104, and 106. By determining which functions can be performed more efficiently in the computing cloud 108 than at the local client 102, 104, and 106, computing resources can be allocated in such a way as to maximize performance.

Figure 2:
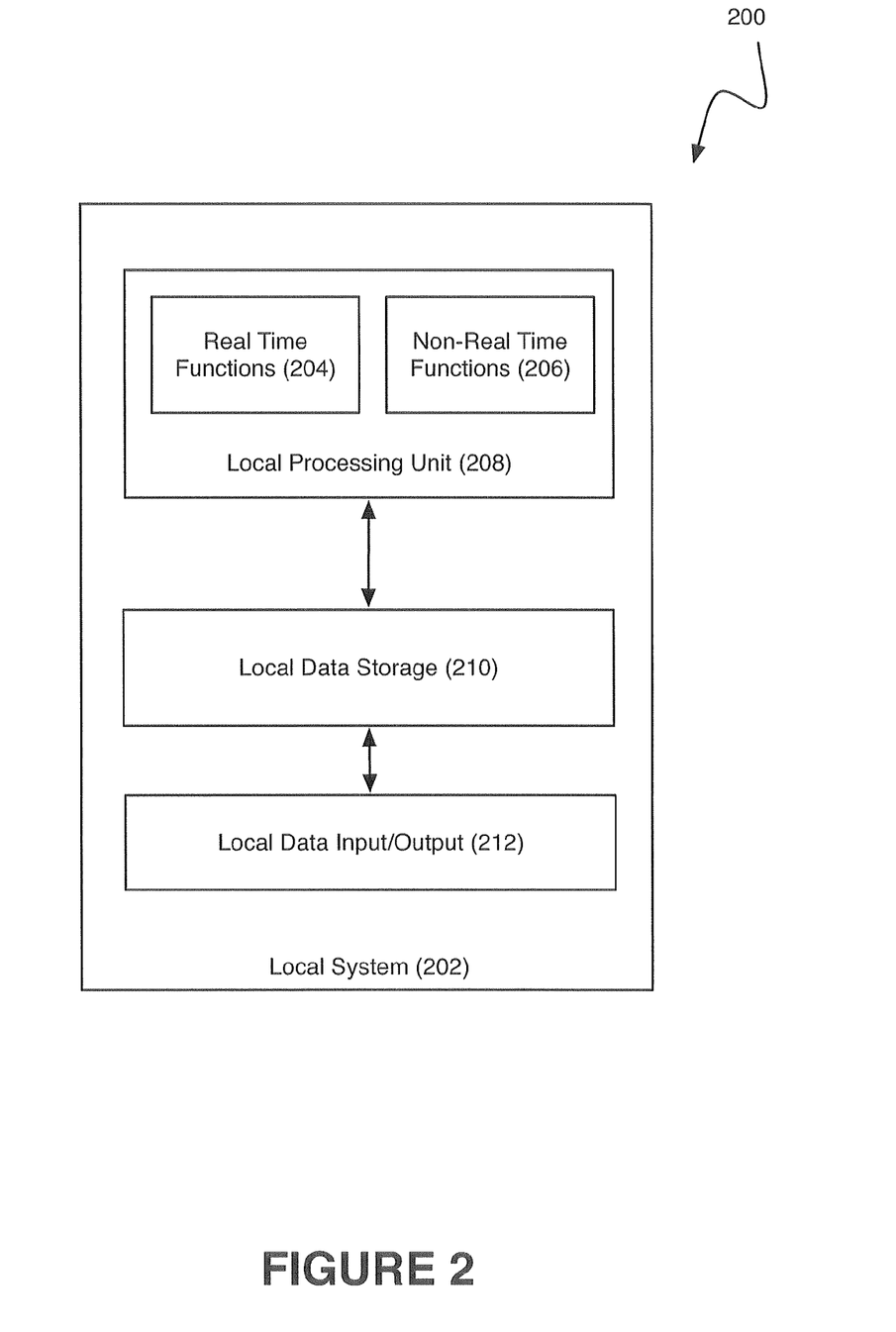
FIG. 2 illustrates an example local system environment according to this disclosure.

FIG. 2 is an illustration 200 of a local system 202. Each client 102, 104, and 106 comprises a local system 202. The local system 202 comprises a local processing unit 208, a local data storage 210, and a local data input/output 212. The local processing unit 208 may comprise both real time functions 204 and non-real-time functions 206.

Real time functions are those functions that instruct or control other devices, including the actual mechanical systems used in a factory. These real time functions are generally always required to be available, and may be designed to be non-resource intensive. An example of these real time functions may include the programming of a basic automated system to perform a specific function (e.g., drill into a substance) for a specific time.

Non-real time functions are functions that may be used to form the real-time functions. Examples of non-real-time functions are those functions used to train the real time functions and simulations of the products created by the non-real-time functions. These non-real-time functions are may be processor intensive and require specialized software.

Not only may functions be performed on a real time or non-real time basis, data may be required by the system on a real or non-real time basis. In one embodiment, data that is required on a real time basis will be stored locally in local data storage 210 while data that is not needed on a real time basis may be stored in the storage unit 112 in the computing cloud 108.

One of the problems with the conventional deployment of MES systems is that the most accurate simulation models were too expensive to deploy into the local systems. In addition, the most accurate simulation models had storage requirements that exceeded the available storage of the local data storage 210. This disclosure overcomes these problems through a process of both data and process segregation. By determining whether a specific process or data is required to be performed in real time or in non-real time, those functions that can be delayed may be placed into the computing cloud 108.

The delineation between real time and non-real time is intended to be an exemplary method of determining which processes and data should be stored locally and which processes and data should be stored in the computing cloud 108. It is expressly understood that other delineations may be used, based on priority or other characteristics of the data. Any system or method that delineates shared processes and storage, and then executes the system and method using a hybrid approach on both a computing cloud 108 and a local system 202 is explicitly contemplated by this disclosure.

Another example of a delineation that may be used to determine which data and which functions are to be placed into the computing cloud 108 is based upon whether the data and functions are "high level" or "low level". A low level function refers to processes that are very precise, specific, and granular. A high level function refers to processes that obtain data from a number of low level functions and is used to form higher order information about the process. A high level function may include a function that is not directly tied to the actual operation of a piece of machinery. Examples of high level functions may include scheduling, reconciliation, or other functions that may be executed in the computing cloud 108.

One of the advantages to the disclosed hybrid approach is the enhancement of manufacturing execution systems (MES). Manufacturing execution systems are used to provide instructions or routines to basic automated systems. Basic automated systems in turn are used to instruct systems directly on what actions to perform (e.g., the actual operation of automation hardware).

Another advantage of the presently disclosed systems and methods is the ability to rapidly deploy new services or features to a plurality of clients without the need to make changes to the clients themselves. As a new service becomes available (e.g., simulation becomes available), this service may be offered to improve the manufacturing process at a given site without the need for reprogramming at the site.

Yet another advantage of the presently disclosed systems and methods is the ability for enhanced data collection and analysis. Through the linking of the clients 102, 104, and 106 to the computing cloud 108, data may be uploaded to the cloud 108 by the clients 102, 104, and 106 that represents real time information related to the data processes. This information may, in turn, be used by the computing cloud 108 for a number of functions, including monitoring the production results and identifying potential problems with equipment. For instance, the cloud may, in some embodiments, apply a model, such as a heuristic model, to identify potential equipment failure. This would allow for proactive preventative maintenance of the equipment.

In some embodiments, the cloud MES can function across sites and correlate data from multiple systems. This approach allows for the improvement of overall system utilization or process equipment from multiple sites or systems.

Figure 3:
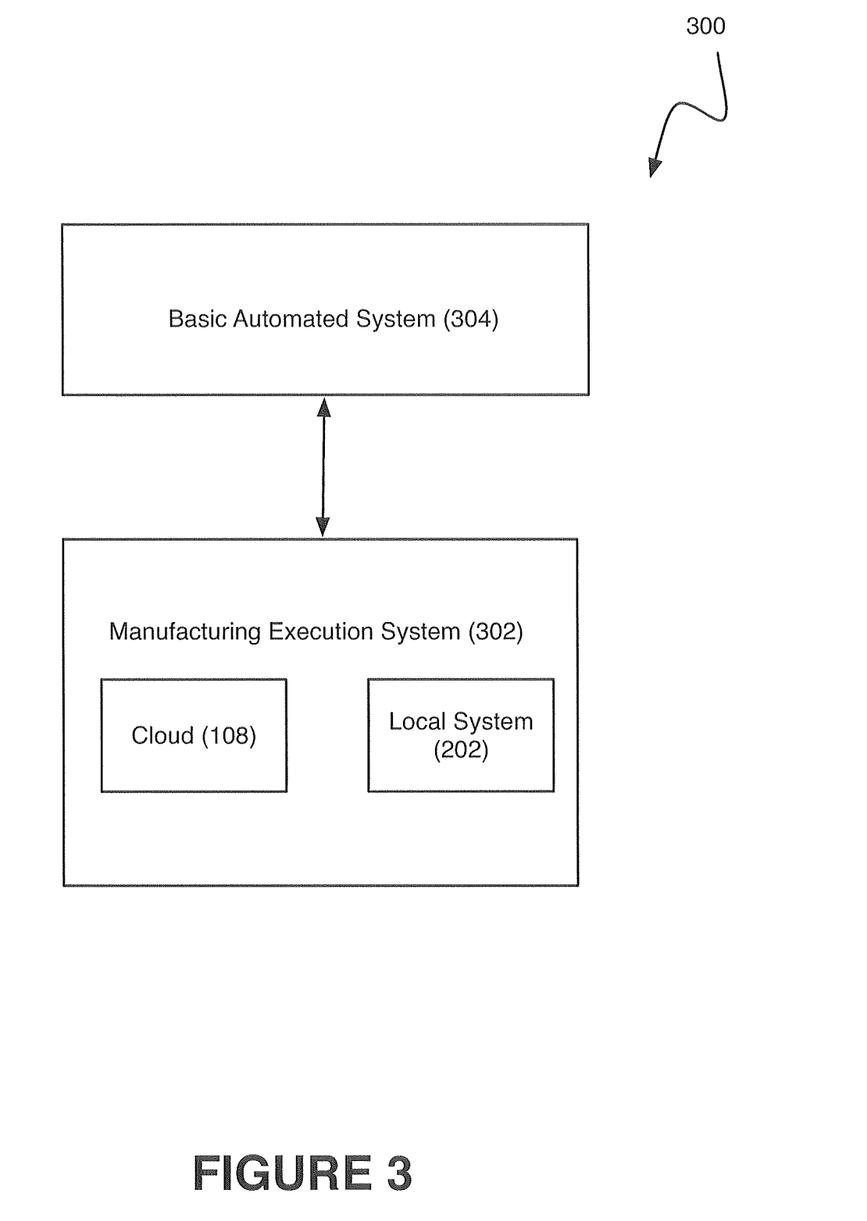
FIG. 3 illustrates an example manufacturing system according to this disclosure.

FIG. 3 is an example embodiment 300 of one system using a manufacturing execution system 302. In this example embodiment, the manufacturing execution system 302 comprises both the computing cloud 108 and the local system 202. The manufacturing execution system 302 is used to control the basic automated system 304. It is understood that the manufacturing execution system may comprise a plurality of local systems and a plurality of computing clouds.

Figure 4:
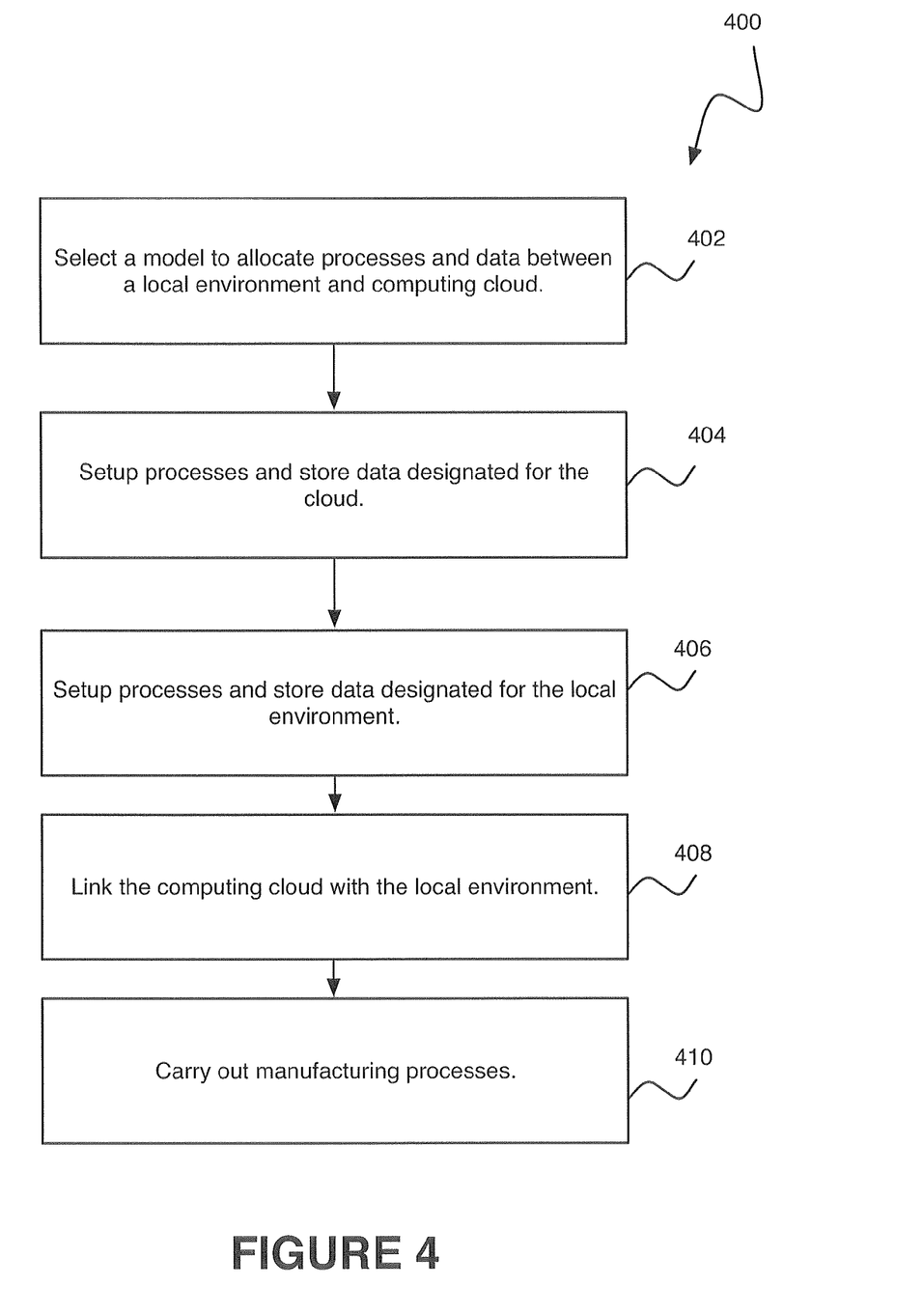
FIG. 4 illustrates an example method of allocating processes and data according to this disclosure.

FIG. 4 is an example of one method 400 of executing the presently disclosed hybrid approach. In this embodiment, a model is selected to allocate processes and data between the local environment 202 and the computing cloud 108 in block 402. In block 404, the processes for the cloud are setup, and data is stored in the cloud. In block 406, the processes for the local environment are setup, and data is stored in the local environment. In block 408, the computing cloud 108 is linked to the local environment 202. In block 410, the manufacturing processes are carried out.

Figure 5:
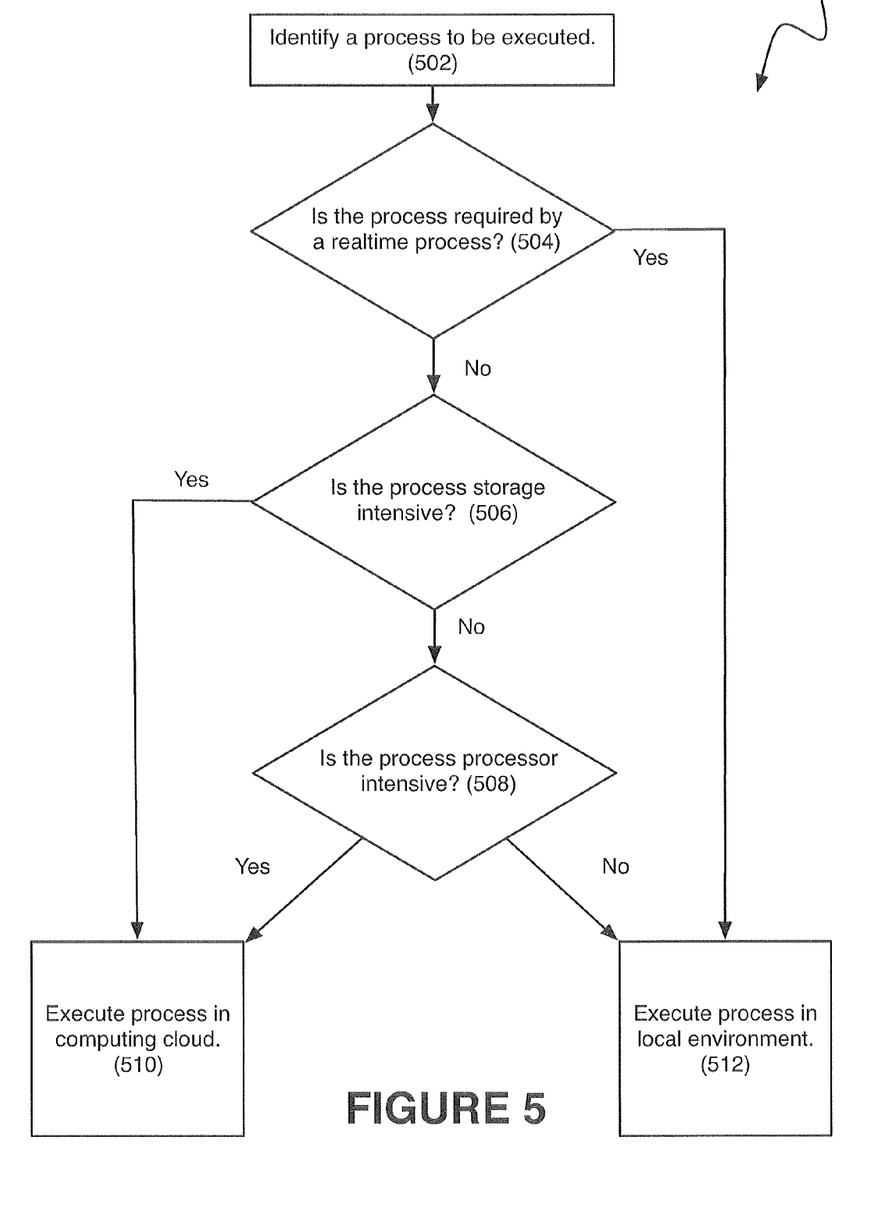
FIG. 5 illustrates another example method of allocating processes and data according to this disclosure.

FIG. 5 is a flowchart 500 illustrating one method of determining if a particular process is going to be executed in the local environment 202 or in the computing cloud 108 using the aforementioned delineation between real-time and non-real-time description. For the purposes of this disclosure, the term "real time" process refers to a process that cannot tolerate disruptions in a data path when data created by the real time process is created. As shown in flowchart 500, a process to be executed is identified in block 502. In block 504, a determination is made as to whether the process is required by a real-time process. If the process is required by a real-time process, the process will be executed in the local environment 202 in block 512. If the process is not required by a real-time process, a determination is made in block 506 as to whether the process is storage intensive. If the process is storage intensive, the process will be executed in the computing cloud 108 in block 510. If the process is not storage intensive, a determination is made in block 508 as to whether the process is processor intensive. If the process is processor intensive, the process is executed in the computing cloud 108 in block 510; otherwise, the process is executed in the local environment 202 in block 512. It is expressly understood that a similar method may be applied to determine if data storage should be stored in the local environment 202 or in the computing cloud 108.

Figure 6:
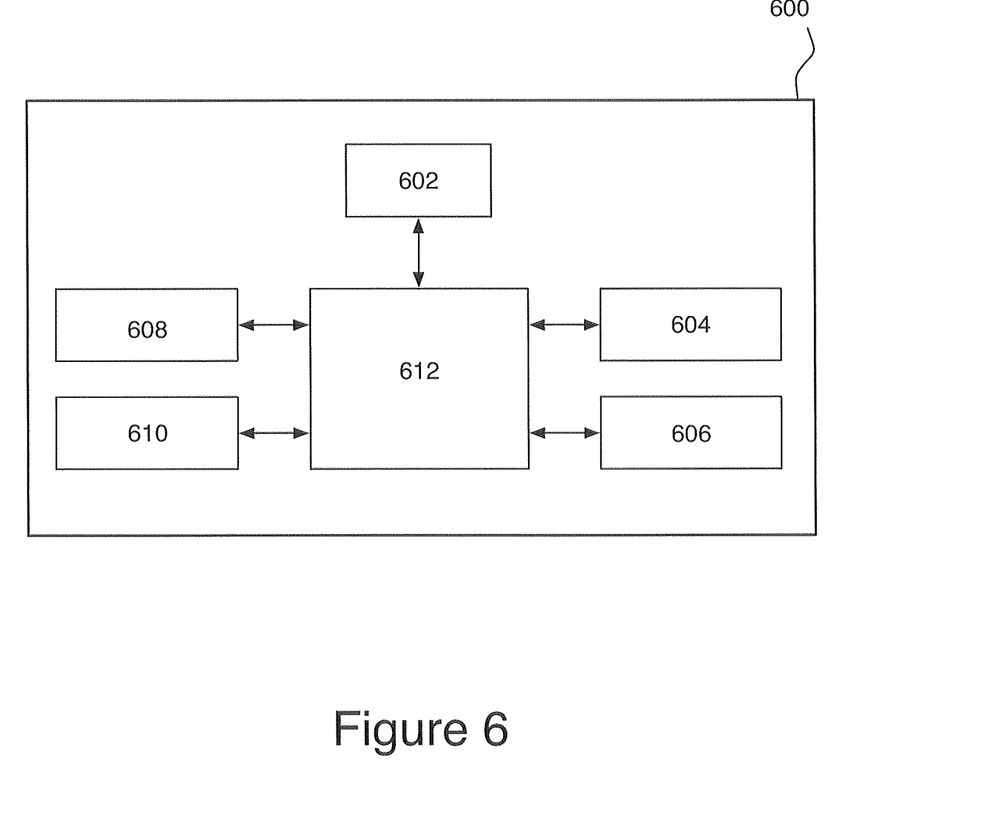
FIG. 6 illustrates an example computer system supporting cloud computing according to this disclosure.

Computing cloud 108 and elements of the local environment 202 described above may be implemented on any general-purpose computer 600 with sufficient processing power, memory resources, and network throughput capability to handle the necessary workload placed upon it. A consumer home personal computer, networked to computing cloud 108 through a wide area network, such as the Internet, may be used in conjunction with the disclosed embodiments. The consumer home personal computer may share some, or all, of the elements of computing cloud 108. FIG. 6 illustrates a typical, computer system suitable for implementing one or more embodiments disclosed herein. The general-purpose computer 600 includes a processor 612 (which may be referred to as a central processor unit or CPU) that is in communication with memory devices including secondary storage 602, read only memory (ROM) 604, random access memory (RAM) 606, input/output (I/O) 608 devices, and network connectivity devices 610. The processor may be implemented as one or more CPU chips.

The secondary storage 602 is typically comprised of one or more disk drives or tape drives and is used for non-volatile storage of data and as an over-flow data storage device if RAM 606 is not large enough to hold all working data. Secondary storage 602 may be used to store programs that are loaded into RAM 606 when such programs are selected for execution. The ROM 604 is used to store instructions and perhaps data that are read during program execution. ROM 604 is a non-volatile memory device that typically has a small memory capacity relative to the larger memory capacity of secondary storage. The RAM 606 is used to store volatile data and perhaps to store instructions. Access to both ROM 604 and RAM 606 is typically faster than to secondary storage 602.

I/O 608 devices may include printers, video monitors, liquid crystal displays (LCDs), touch screen displays, keyboards, keypads, switches, dials, mice, track balls, voice recognizers, card readers, paper tape readers, or other well-known input devices. The network connectivity devices 610 may take the form of modems, modem banks, ethernet cards, universal serial bus (USB) interface cards, serial interfaces, token ring cards, fiber distributed data interface (FDDI) cards, wireless local area network (WLAN) cards, radio transceiver cards such as code division multiple access (CDMA), time division multiple access (TDMA) and/or global system for mobile communications (GSM) radio transceiver cards, and other well-known network devices. These network connectivity devices 610 may enable the processor 612 to communicate with an Internet or one or more intranets. With such a network connection, it is contemplated that the processor 612 might receive information from the network, or might output information to the network in the course of performing the above-described method steps. Such information, which is often represented as a sequence of instructions to be executed using processor 612, may be received from and outputted to the network, for example, in the form of a computer data signal embodied in a carrier wave.

Such information, which may include data or instructions to be executed using processor 612 for example, may be received from and outputted to the network, for example, in the form of a computer data baseband signal or signal embodied in a carrier wave. The baseband signal or signal embodied in the carrier wave generated by the network connectivity devices 610 may propagate in or on the surface of electrical conductors, in coaxial cables, in waveguides, in optical media, for example optical fiber, or in the air or free space. The information contained in the baseband signal or signal embedded in the carrier wave may be ordered according to different sequences, as may be desirable for either processing or generating the information or transmitting or receiving the information. The baseband signal or signal embedded in the carrier wave, or other types of signals currently used or hereafter developed, referred to herein as the transmission medium, may be generated according to several methods well known to one skilled in the art.

The processor 612 executes instructions, codes, computer programs, scripts that it accesses from hard disk, floppy disk, optical disk (these various disk based systems may all be considered secondary storage 602), ROM 604, RAM 606, or the network connectivity devices 610.

While shown as a series of steps, various steps in FIGS. 4 and 5 could overlap, occur in parallel, occur in a different order, or occur multiple times. Further, note that these steps could occur at any suitable time, such as in response to a command from a user or external device or system.

In some embodiments, various functions described above are implemented or supported by a computer program that is formed from computer readable program code and that is embodied in a computer readable medium. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory.

It may be advantageous to set forth definitions of certain words and phrases used throughout this patent document. The term "couple" and its derivatives refer to any direct or indirect communication between two or more elements, whether or not those elements are in physical contact with one another. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like. The term "controller" means any device, system, or part thereof that controls at least one operation. A controller may be implemented in hardware, firmware, software, or some combination of at least two of the same. The functionality associated with any particular controller may be centralized or distributed, whether locally or remotely.

While this disclosure has described certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure, as defined by the following claims.

What is claimed is:

1. A computing cloud system comprising:
at least one data storage configured to store first information associated with at least one manufacturing execution system, wherein information associated with the at least one manufacturing execution system is delineated between the first information stored remotely in the at least one data storage and second information to be stored at a local computer system, wherein the first information is not stored at the local computer system and the second information is not stored remotely in the at least one data storage and is different in functional use from the first information, wherein a simulation model is selected for the delineation, and wherein each of the first information and the second information has a characteristic indicating whether that information is to be stored at the local computer system or stored remotely in the at least one data storage;

at least one processor configured to:
in response to an identification of a process to be executed that is associated with the at least one manufacturing execution system, determine whether the process is to be executed by the at least one processor in the computing cloud system or by the local computer system; and
in response to a determination that the process is to be executed by the at least one processor in the computing cloud system, execute instructions of the process associated with the at least one manufacturing execution system; and at least one communications interface configured to receive information from at least one manufacturing site, to interpret the received information from the at least one manufacturing site, and to provide information to the at least one manufacturing site.

2. The system of claim 1, wherein the at least one data storage is configured to store at least one manufacturing history, and wherein the provided information is provided to the at least one manufacturing site as if the information is stored at the at least one manufacturing site.

3. The system of claim 1, wherein the received information from the at least one manufacturing site comprises information associated with at least one machine at the at least one manufacturing site.

4. The system of claim 3, wherein the information associated with the at least one machine comprises information obtained by sensors at the at least one manufacturing site.

5. The system of claim 4, wherein the information obtained by the sensors at the at least one manufacturing site is used by the at least one processor to predict future equipment failure.

6. The system of claim 4, wherein the information obtained by the sensors at the at least one manufacturing site is used by the at least one processor to refine operating parameters of the at least one machine.

7. The system of claim 1, wherein the provided information provided to the at least one manufacturing site comprises instructions associated with operation of at least one machine at the at least one manufacturing site.

8. The system of claim 1, wherein the at least one processor is configured to determine whether the process is to be executed by the at least one processor in the computing cloud system or by the local computer system based on storage resources and processor resources to execute the process.

9. The system of claim 1, wherein the at least one processor is configured to determine whether the process is to be executed by the at least one processor in the computing cloud system or by the local computer system based on whether the process is used by a real-time process.

10. A method comprising:
operating a manufacturing execution system;
connecting at least one client of the manufacturing execution system to a computing cloud system;
in response to an identification of a process to be executed that is associated with the at least one manufacturing execution system, determining whether the process is to be executed by at least one processor in the computing cloud system or by a local computer system that is local to the at least one client, and
in response to a determination that the process is to be executed by the at least one processor in the computing cloud system, executing instructions of the process associated with the at least one manufacturing execution system;

wherein the computing cloud comprises:
at least one data storage configured to store first information associated with the at least one client, wherein information associated with the at least one client is delineated between the first information stored remotely in the at least one data storage and second information to be stored at the local computer system that is local to the at least one client, wherein the first information is not stored at the local computer system and the second information is not stored remotely in the at least one data storage and is different in functional use from the first information, wherein a simulation model is selected for the delineation, and wherein each of the first information and the second information has a characteristic indicating whether that information is to be stored at the local computer system or stored remotely in the at least one data storage unit; and
the at least one processor configured to use the first information stored in the at least one data storage.

11. The method of claim 10, wherein determining whether the process is to be executed by the at least one processor in the computing cloud system or by the local computer system comprises determining whether the process is to be executed by the at least one processor in the computing cloud system or by the local computer system based on storage resources and processor resources to execute the process.

12. The method of claim 10, wherein the at least one data storage stores information associated with an operational history of the at least one client.

13. The method of claim 10, wherein the manufacturing execution system is used to predict a hardware failure of an item within the at least one client.

14. The method of claim 10, wherein determining whether the process is to be executed by the at least one processor in the computing cloud system or by the local computer system comprises determining whether the process is to be executed by the at least one processor in the computing cloud system or by the local computer system based on whether the process is used by a real-time process.

15. An apparatus comprising:
at least one data storage comprising instructions associated with a manufacturing execution system, wherein the manufacturing execution system includes instructions for a plurality of applications that are delineated between a first application stored remotely in the at least one data storage and a second application to be stored at a local computer system that is local to at least one client, wherein the first application is not stored at the local computer system and the second application is not stored remotely in the at least one data storage and is different in process from the first application, wherein a simulation model is selected for the delineation, and wherein each of the first application and the second application has a characteristic indicating whether that application is to be stored at the local computer system or stored remotely in the at least one data storage unit;
at least one processor configured to:
in response to an identification of a process to be executed that is associated with the manufacturing execution system, determine whether the process is to be executed by the at least one processor in the computing cloud system or by the local computer system; and
in response to a determination that the process is to be executed by the at least one processor in the computing cloud system, execute instructions of the process associated with the manufacturing execution system; and
at least one communications interface configured to provide at least one communications link used to exchange information associated with the manufacturing execution system.

16. The apparatus of claim 15, wherein the at least one processor is configured to determine whether the process is to be executed by the at least one processor in the computing cloud system or by the local computer system based on storage resources and processor resources to execute the process.

17. The apparatus of claim 15, wherein the apparatus is configured to control the at least one client through the at least one communications interface.

18. The apparatus of claim 15, wherein the apparatus is configured to provide a manufacturing history of every client connected to the apparatus.

19. The apparatus of claim 18, wherein the at least one processor is configured to interpret information from the manufacturing history to determine if a fault occurs.

20. The system of claim 1, wherein:
the at least one data storage is configured to store software that is not deployed locally at the at least one manufacturing site;
the at least one processor is configured to provide the software to the at least one manufacturing site through the at least one communications interface;
the first information stored remotely comprises information for use by the software for one or more non-real time functions; and
the second information stored at the local computer system comprises information for use in one or more real time functions.

21. The system of claim 1, wherein the system is configured to abstract consumers of cloud services from location services using a Service Oriented Architecture.

22. The system of claim 1, wherein:
the first information comprises higher level information, the higher level information comprising higher level data and functions from processes that obtain data from a number of lower level functions; and
the second information comprises lower level information, the lower level information comprising lower level data and the lower level functions.

23. The apparatus of claim 15, wherein the at least one processor is configured to determine whether the process is to be executed by the at least one processor in the computing cloud system or by the local computer system based on whether the process is used by a real-time process.

* * * * *